United States Patent [19]

Gough

[11] Patent Number: 4,878,309
[45] Date of Patent: Nov. 7, 1989

[54] FISHING ROD

[76] Inventor: Roger M. Gough, 75 Young St., New Plymouth, New Zealand

[21] Appl. No.: 284,703

[22] Filed: Dec. 15, 1988

[30] Foreign Application Priority Data

Dec. 16, 1987 [NZ] New Zealand ..................... 222953

[51] Int. Cl.$^4$ ............................................. A01K 87/06
[52] U.S. Cl. ........................................ 43/18.1; 43/23
[58] Field of Search ....................... 43/18.1, 18.5, 23; 242/84.1

[56] References Cited

U.S. PATENT DOCUMENTS

| 733,836 | 0/1903 | Hall et al. |
|---|---|---|
| 1,150,575 | 0/1915 | Blodgett . |
| 2,299,156 | 0/1942 | Lind . |
| 2,402,882 | 0/1946 | Garr . |
| 2,492,587 | 0/1949 | Ledingham . |
| 2,537,613 | 0/1951 | Allen . |
| 2,628,444 | 0/1953 | Oak . |
| 2,772,505 | 0/1956 | Kaiser . |
| 3,296,732 | 1/1967 | Magnus ................................. 43/23 |
| 3,417,500 | 12/1968 | Carabasse ............................ 43/18.1 |
| 3,432,958 | 3/1969 | Bellinger ............................. 43/18.1 |
| 3,447,254 | 6/1969 | Sobel et al. ......................... 43/18.1 |
| 3,727,338 | 4/1973 | Pedersen ............................. 43/18.1 |
| 4,043,070 | 8/1977 | Lamothe ............................. 43/18.1 |
| 4,195,434 | 4/1980 | Neitzke . |
| 4,227,659 | 10/1980 | Pindell . |

FOREIGN PATENT DOCUMENTS

| 0073072 | 3/1987 | European Pat. Off. . |
|---|---|---|
| 1521695 | 3/1968 | France ................................. 43/18.1 |
| 1034710 | 6/1966 | United Kingdom . |
| 1465201 | 2/1977 | United Kingdom . |

Primary Examiner—M. Jordan
Attorney, Agent, or Firm—Bacon & Thomas

[57] ABSTRACT

A fishing rod having a reel mounted on one end thereof and a handle rotatable about the reel to facilitate winding and unwinding of a line on the reel. The line being disengageable from the handle to facilitate surfcasting of the line from the reel.

7 Claims, 4 Drawing Sheets

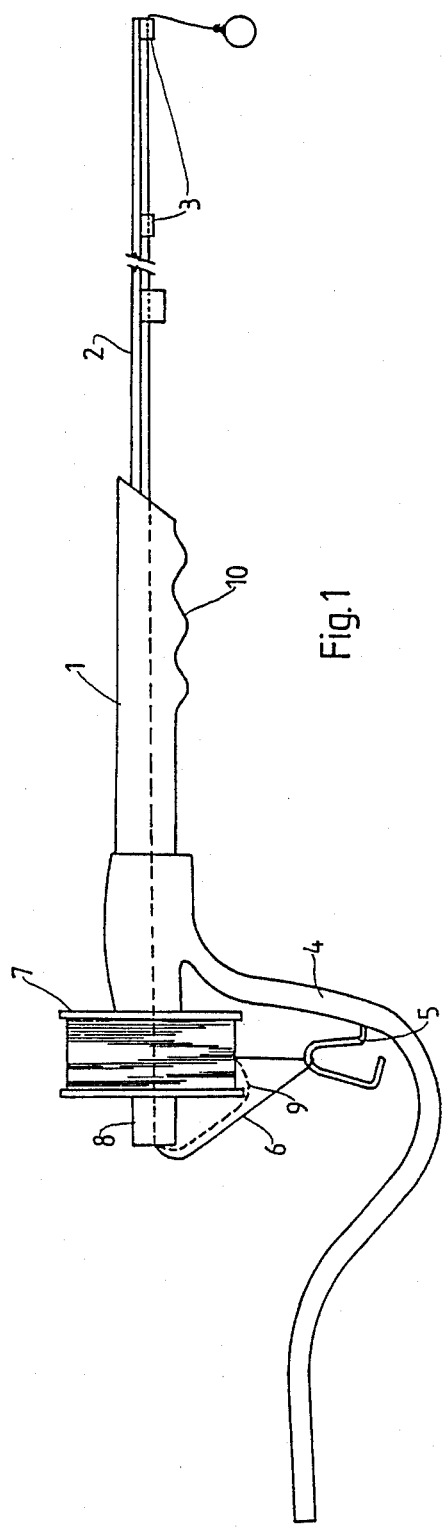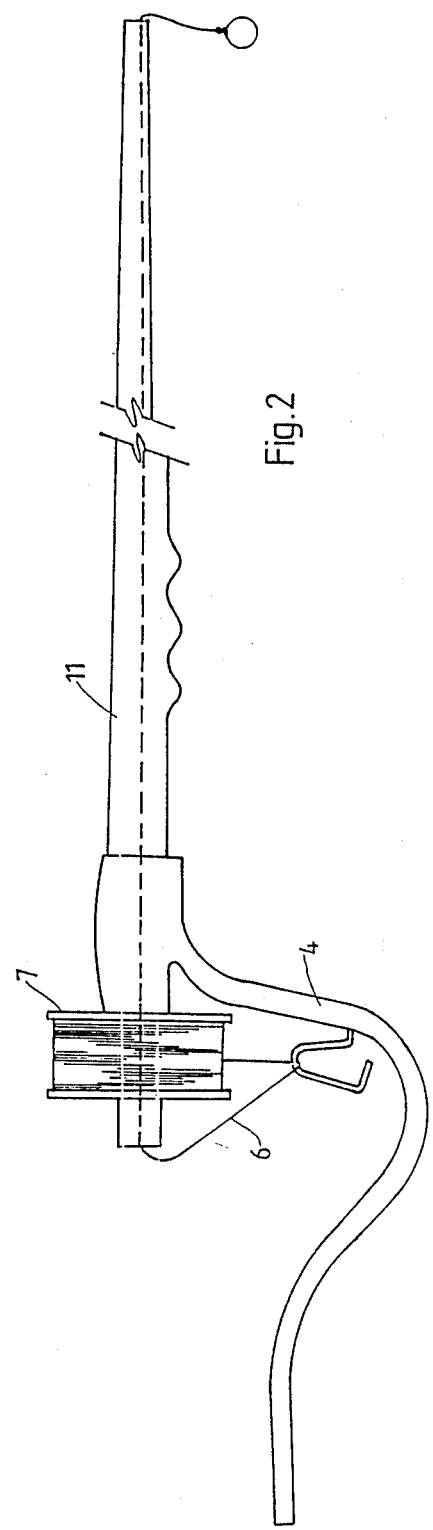

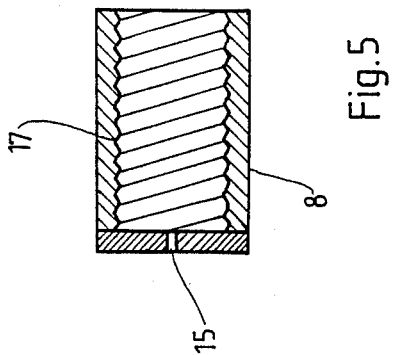
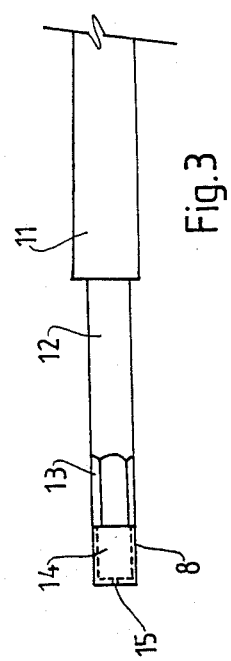
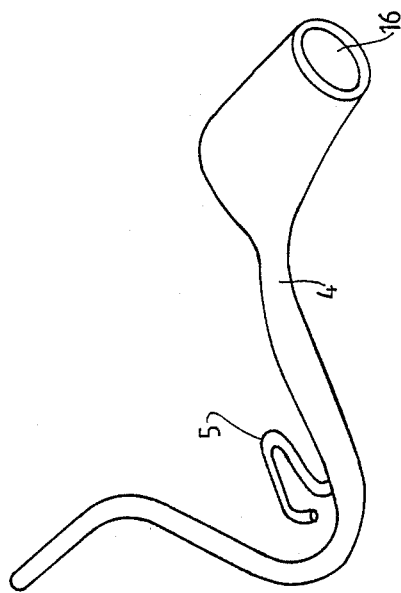

FISHING ROD

The present invention relates to an improved fishing rod. More particularly but not exclusively, the present invention relates to a light weight recreational fishing rod.

To the present time various types of fishing rods have been commercially available but to varying degrees have suffered from the disadvantages of being expensive, complex and/or inefficient. More specifically, many fishing rods to the present date have required complex reels which have increased the cost of the fishing rods. Other, simpler rods have provided inferior performance.

U.S. Pat. No. 2772505 discloses a fishing rod similar to the rod of the present invention. The rod has a handle portion with a reel thereon and a bore therethrough. the bore accommodates a shaft rotatable by a crank at the end of the handle which rotates a winding member about the reel to facilitate winding and unwinding. This fishing rod has the disadvantage, however, that it cannot facilitate surfcasting as the winding member prevents line spooling off the reel.

It is thus an object of the present invention to provide a fishing rod which is relatively cheap, simple and effective and able to facilitate surfcasting and the delivery and retrieval of line without a complex reel mechanism, or to at least provide the public with a useful choice.

Further objects of the invention will become apparent from the following description.

According to one aspect of the present invention there is thus provided a fishing rod including a shaft having a reel mounted substantially para-axial therewith and a winding member rotatable about said reel to facilitate winding and unwinding of a line on said reel, characterised in that the line extends from said reel to a hook connected to the winding member and then towards the free end of said reel.

Further aspects of this invention which should be considered in all its novel aspects, will become apparent from the following description given by way of example of possible embodiments thereof and in which reference is made to the accomanying drawings wherein:

FIG. 1 Shows a fishing rod according to a first embodiment of the present invention.

FIG. 2 Shows a fishing rod according to a second embodiment of the present invention.

FIG. 3 Shows the shaft of the fishing rod of the embodiment shown in FIG. 2.

FIG. 4 Shows the winding means of the fishing rod of the present invention.

FIG. 5 Shows the knob of the fishing rod shown in FIG. 1.

Figure 6:
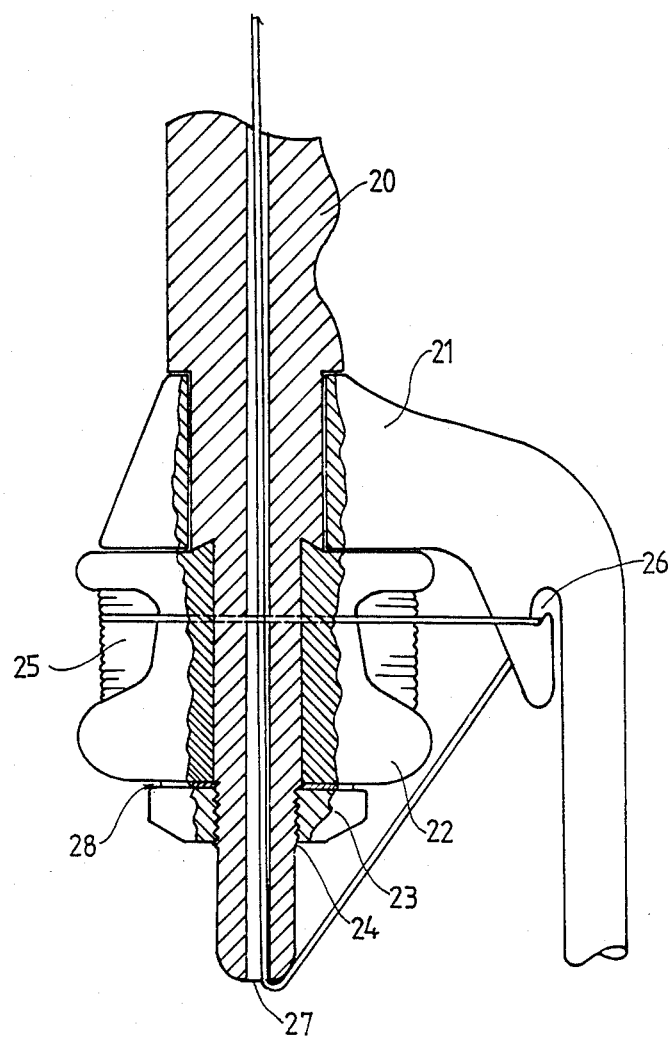
FIG. 6 Shows a fishing rod according to another embodiment of the present invention.

The present invention relates to a fishing rod which in one embodiment thereof is particularly suitable for use as a light weight recreational fishing rod. However, it is to be appreciated that the present invention has applications wherever a simple and effective winding means is required.

Referring now particularly to FIG. 1 there is shown a fishing rod haaving a body portion 1 including a shaft 2 having a plurality of eyelets 3 mounted therealong. Winding means 4 is mounted coaxially with body 1 and is able to rotate thereabout. Winding means 4 includes a hook 5 which may be attached thereto or formed integrally therewith. Reel 7 is seen to be provided with a line 6 thereon. Line 6 may be fed from reel 7 through an aperture in knob 8. Line 6 may then be fed through body 1 and eyelets 3 with the end thereof being attached to suitable fishing tackle. Line 6 may be selectively engaged with or disengaged from hook 5.

In a preferred embodiment of the present invention reel 7 is securely fastened to body 1 to prevent rotation thereabout. Accordingly, when line 6 is engaged with hook 5, hook 5 prevents line 6 releasing from reel 7 unless winding means 4 is rotated aabout body portion 1. Rotaation of winding means 4 about body portion 1 in one direction winds line in whereas rotation in the other direction allows line to be released.

Reel 7 is preferably mounted substantially para-axial to shaft 2. "Para-axial" in this specification means that the axis of the reel lies in a direction generally parallel to the axis of the shaft, and in a preferred embodiment is coaxial with the shaft. It is envisaged that reel 7 may in one embodiment be mounted at a slight angle to shaft 2 so that line may be evenly distributed over the reel. In this specification the "free end" of the reel refers to the end of the reel remote from winding means 4 and the "forward end" refers to the end of said reel adjacent said winding member.

To allow the free flow of line from reel 7 line 6 may be disengaged to the position shown by dotted line 9. In this way surfcasting may be facilitated as line 6 will freely flow from reel 7 as hook 5 no longer prevents its release.

Body 1 may further be provided with a hand grip 10 to ensure a secure grip of the rod. In one embodiment hand grip 10 may be placed at the center of gravity of the rod to allow ease of balancing.

Referring now to FIG. 2 a second embodimnent is shown wherein shaft 11 is a continuous hollow rod through which line 6 may be fed. In this way the complex arrangement of shaft 2 and eyelets 3 may be avoided. Shaft 2 in FIG. 1 or shaft 11 in FIG. 2 may be telescopic to allow the rod to be of compact construction.

Referring now to FIG. 3 shaft 11 is shown separated from winding means 4 and reel 7. Shaft 11 is seen to be provided with a circular cross-section 12 adapted to allow the rotation of winding means 4 thereabout. Shaft 11 may also be provided with a hexagonal portion 13 adapted to engage with the hexagonal bore of a standard fishing line reel to prevent rotation of reel 7 about shaft 12. It is not essential to the present invention for the body part 11 to have hexagonal portion 13 as a circular reel may be secured by forcing the circular bore onto a conical section or alternatively the reel may be affixed by glue or similar means.

Knob 8 may be provided to ensure that reel 7 does not detach from portion 13 and may be secured to rod 11 by a thread or some other means or may alternatively be a snap fit device able to slideably engage with body part 11. All that is required is something to prevent reel 7 from sliding off portion 13.

FIG. 3 shows the hexagonal shape of portion 13 and the circular shape of body part 11. However these shapes need not be circular or hexagonal and may take any cross-section depending upon the particular application.

Referring now to FIG. 4 winding means 4 is shown in perspective. Winding means 4 is seen to include a cylindrical bore 16 adapted to engage with portion 12 of body 11 and freely rotate thereabout. Winding means 4 is further provided with a hook 5 which may be formed therewith or attached at a later stage.

Referring to FIG. 5 knob 8 is seen to have an aperture 15 therein to allow the passage of line therethrough. Knob 8 is further provided with a threaded portion 17 which may engage with a threaded portion of section 14 shown in FIG. 3. Although as discussed previously knob 8 need not be secured by a thread and any suitable method of securing may be appropriate.

Referring now to FIG. 6, a fishing rod according to another embodiment of the present invention is shown. The fishing rod is seen to comprise a shaft 20, winding means 21, reel 22, and nut 23. In this embodiment the reel 22 may be secured to shaft 20 by tightening nut 23 along threaded portion 24 of shaft 20. Nut 23 may have suitable projections therefrom to provide a good grip for an operator tightening or loosening nut 23.

In use nut 23 may be tightened when the operator wishes to wind or unwind line as when reel 22 is fixedly secured to shaft 20, and the line engaged with hook 26, line may only be released or taken in by rotation of handle 21 about shaft 20. If nut 23 is loosened reel 22 may rotate about shaft 20 and line may be released without the need to rotate handle 21 about shaft 20. In one embodiment of the present invention, a washer 28 may be provided between nut 23 and reel 22.

Figure 7:
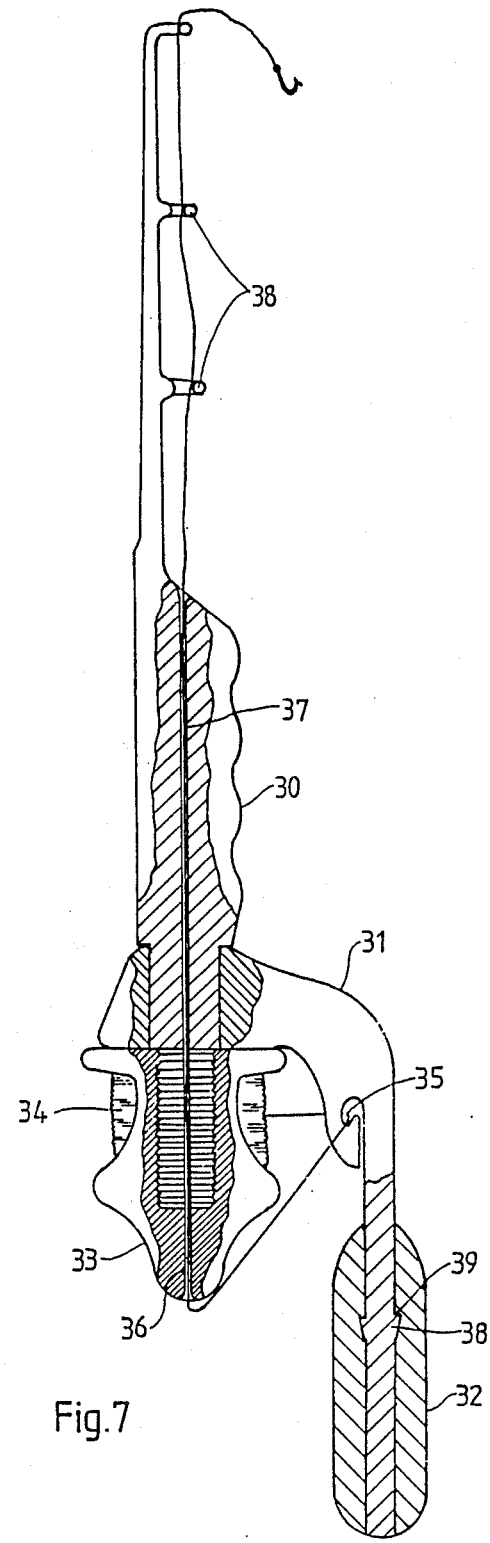
FIG. 7 Shows a fishing rod according to another embodiment of the present invention.

Referring now to FIG. 7, a fishing rod according to another embodiment of the present invention is shown. The fishing rod is seen to comprise a shaft 30, winding means 31, handle 32 and reel 33. Reel 33 is seen to be provided with line 34 which may pass through aperture 35 whereupon it may feed through bore 36 in reel 33 and bore 37 in shaft 30. Upon exiting the bore 37 in shaft 30, the line may then pass through a plurality of eyelets 38.

In this embodiment handle 32 may freely rotate about winding means 31 so that a firm grip may be kept on handle 32 whilst an operator is winding or unwinding. Handle 32 is retained upon winding means 31 by means of flange 38 engaging with recess 39.

The fishing rod of the present invention may suitably be constructed of metal, fiberglass, carbon fibre, graphite, plastics material or any other strong, light weight and non-corrodable material. It is envisaged a combination of such materials may be used with each being utilised in the component requiring that materials properties.

It is thus seen that the present invention provides a simple, light weight and effective fishing rod capable of facilitating surfcasting and winding and unwinding of line.

Where in the aforegoing description reference has been made to specific components or integers of the invention having known equivalents then such equivalents are herein incorporated as if individually set forth.

Although this invention has been described by way of example and with reference to possible embodiments thereof it is to be understood that modifications or improvements may be made thereto without departing from the scope of the invention as defined in the appended claims.

We claim:

1. A fishing rod including a shaft having a reel mounted substantially para-axial therewith and a winding member rotatable about said reel to facilitate winding and unwinding of a line on said reel, characterised in that the line extends from said reel to a hook connected to the winding member and then towards the free end of said reel.

2. A fishing rod as claimed in claim 1 wherein said hook is formed integrally with said winding member.

3. A fishing rod as claimed in claim 1 wherein line from said reel may be selectively engaged with said hook to facilitate winding or unwinding and disengaged from said hook to facilitate surfcasting.

4. A fishing rod as claimed in claim 1 wherein said winding member has a bore therethrough adapted to engage with a portion of said shaft to allow rotation of said winding member about said shaft, wherein said winding member is adjacent to the forward end of said reel.

5. A fishing rod as claimed in claim 1 wherein said shaft has a hollow portion at the reel end thereof adapted to allow the passage of a line therethrough.

6. A fishing rod as claimed in claim 1 wherein said shaft is hollow along the entire length thereof and allows the passage of line therethrough.

7. A fishing rod as claimed in claim 1 wherein said reel is secured to said shaft by a nut which when loosened enables rotation of said reel about said shaft.

* * * * *